US012331696B2

(12) United States Patent
Fankhauser et al.

(10) Patent No.: US 12,331,696 B2
(45) Date of Patent: Jun. 17, 2025

(54) CYLINDER LINER, APPARATUS FOR EXTRACTING A CYLINDER LINER AND METHOD FOR EXTRACTING A CYLINDER LINER

(71) Applicant: INNIO Jenbacher GmbH & Co OG, Jenbach (AT)

(72) Inventors: Thomas Fankhauser, Finkenbert (AT); Florian Becker, Muenster (AT); Johannes Dengg, Hainzenberg (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/275,203

(22) PCT Filed: Feb. 1, 2021

(86) PCT No.: PCT/AT2021/060036
§ 371 (c)(1),
(2) Date: Jul. 31, 2023

(87) PCT Pub. No.: WO2022/159991
PCT Pub. Date: Aug. 4, 2022

(65) Prior Publication Data
US 2024/0084758 A1 Mar. 14, 2024

(51) Int. Cl.
*F02F 1/00* (2006.01)
*B25B 27/02* (2006.01)

(52) U.S. Cl.
CPC .............. *F02F 1/004* (2013.01); *B25B 27/02* (2013.01); *F02F 2001/006* (2013.01)

(58) Field of Classification Search
CPC ..... F02F 1/004; F02F 2001/006; B25B 27/02; B25B 27/0035
See application file for complete search history.

(56) References Cited

U.S. PATENT DOCUMENTS 3,805,359 A * 4/1974 Webb ...................... B25B 27/06 29/282
3,945,104 A * 3/1976 Brookover, Jr. ......... B25D 1/16 29/282

(Continued)

FOREIGN PATENT DOCUMENTS

DE 3202258 A1 * 9/1982
DE 19703530 C1 10/1998

(Continued)

OTHER PUBLICATIONS

PCT International Search Report and Written Opinion; Application No. PCT/AT2021/060036; dated Oct. 8, 2021; 13 pages.

*Primary Examiner* — Grant Moubry
(74) *Attorney, Agent, or Firm* — Fletcher Yoder, P.C.

(57) ABSTRACT

Cylinder liner for an internal combustion engine, comprising:

a cylindrical portion having an outer diameter and an inner diameter, the inner diameter at least partly realizing a cylinder wall, when the cylinder liner is mounted in the internal combustion engine, a circumferential recess at the inner diameter of the cylindrical portion having a larger diameter than the inner diameter of the cylinder wall, wherein the circumferential recess is located at one end of the cylindrical portion, and a removable scraper ring, wherein the recess comprises at least one groove, wherein a size of the scraper ring is adapted to fit into the recess and to cover the at least one groove.

20 Claims, 3 Drawing Sheets

(56) References Cited

U.S. PATENT DOCUMENTS

| | | | | | |
|---|---|---|---|---|---|
| 4,530,141 | A * | 7/1985 | Vachon | B25B 27/06 29/888.011 |
| 4,589,180 | A * | 5/1986 | Vachon | B25B 27/06 72/393 |
| 7,003,877 | B2 | 2/2006 | Reale | |
| 2004/0049904 | A1 * | 3/2004 | Reale | B25B 27/062 29/426.5 |
| 2016/0047331 | A1 * | 2/2016 | Graham | B23P 19/042 123/193.2 |

FOREIGN PATENT DOCUMENTS

| | | | | |
|---|---|---|---|---|
| DE | 20208909 | U1 | 9/2002 | |
| EP | 1803527 | B1 * | 9/2018 | B23P 19/043 |
| WO | 2017149190 | A1 | 9/2017 | |

* cited by examiner

CYLINDER LINER, APPARATUS FOR EXTRACTING A CYLINDER LINER AND METHOD FOR EXTRACTING A CYLINDER LINER

CROSS-REFERENCE TO RELATED APPLICATION

This application is a National Stage entry from, and claims benefit of, PCT Application No. PCT/AT2021/060036, filed on Feb. 1, 2021, entitled "CYLINDER LINER, APPARATUS FOR EXTRACTING A CYLINDER LINER AND METHOD FOR EXTRACTING A CYLINDER LINER", which is herein incorporated by reference in its entirety.

BACKGROUND

The invention concerns a cylinder liner, an apparatus for extracting such a cylinder liner from a crankcase of an internal combustion engine, and a method for extracting such a cylinder liner.

It is common to use cylinder liners for internal combustion engines in which the piston reciprocates. In such embodiments, the cylinder wall is in many cases not part of the crankcase itself. The cylinder wall is part of a separate component (the so-called cylinder liner), which is arranged in a specially designed fitting bore in the crankcase.

Generally, three different design concepts are common, the top-, mid-, and bottom stop concept. The top-stop liner concept is so called because it has a flange on the top (i.e., close to the cylinder head) of the cylinder liner, wherein the cylinder liner is located and/or secured in its position at the crankcase by use of this flange. The mid-stop has a similar flange at or near the middle of the cylinder liner, and the bottom stop has its locating flange near the lower end of the cylinder liner (seen in a mounted state of the cylinder liner in an internal combustion engine along a longitudinal direction or in a direction of reciprocation of the cylinders in the cylinder liner).

Due to the continuous increase in engine performance in recent years, crankpins and connecting rods must be made more and more massive. As a result, the connecting rods are designed with dimensions such that they cannot be installed and removed through the bore of the cylinder liner, but only through the cylinder liner fitting bore in the crankcase. Consequently, the piston, the connecting rod as well as the cylinder liner together (also referred to as the power unit) are removed or installed for (re-) assembling or maintenance.

From the prior art tools and concepts, it is known how the power unit can be removed or installed. For example, U.S. Pat. No. 7,003,877 B2 describes an apparatus to disengage a cylinder liner from an engine. The tool comprises a wedge and a collet, wherein the wedge can be moved in a longitudinal direction by an adjusting portion, leading to a radial movement of the collet and consequently leading to a force-fitting between the liner and the collet. The disadvantage is the friction-based force transmission and the necessity that the tool needs to project deeply into the cylinder liner.

Such friction-based apparatus needs a large contact surface in view of the mostly by lubricants and/or oils polluted cylinder wall of the cylinder liner. Furthermore, the growing weights of these components, which have to be removed by the apparatus, additionally increase the contact surfaces.

Other concepts require to grab the piston in the area of the piston crown to pull the power unit out of the crankcase fitting bore. The disadvantage of such concepts is that either (in case of extraction of the power unit) piston rings need to be removed before the tool is mounted at the piston or (in case of assemblage) the piston rings laboriously need to be attached to the piston after removal of the tool.

In order to lift the power unit into or out of the crankcase/engine block, but especially in view of a cold welded or corroded cylinder liner in the crankcase, it would be necessary to have a force applied to a relatively small (almost point-like) surface.

BRIEF DESCRIPTION

An aspect of the invention is therefore to provide a cylinder liner, an apparatus for extracting such a cylinder, and a method for extracting such a cylinder liner which overcomes the before mentioned disadvantages and/or wherein the extracting process can be simplified.

This aspect is achieved by a cylinder liner with the features recited in the claims, an apparatus for extracting such a cylinder liner from a crankcase of an internal combustion engine with the features recited in the claims, and a method for extracting such a cylinder liner with the features recited in the claims.

According to certain aspects of the invention, it is provided that the cylinder liner comprises:

- a cylindrical portion having an outer diameter and an inner diameter, the inner diameter at least partly realizing a cylinder wall, when the cylinder liner is mounted in the internal combustion engine,
- a circumferential recess at the inner diameter of the cylindrical portion having a larger diameter than the inner diameter of the cylinder wall, wherein the circumferential recess is located at one end of the cylindrical portion, and
- a removable scraper ring, wherein the recess comprises at least one groove, wherein a size of the scraper ring is adapted to fit into the recess and to cover the at least one groove.

By use of a recess, which can be covered by a scraper ring, the possibility is given to manufacture at least one groove, wherein the groove does not affect the functionality of the cylinder liner during operation of the internal combustion engine.

The at least one groove can be used as contact surface for grabbing the power unit during removing from or installing in the internal combustion engine.

By use of the at least one groove an undercut is given, wherein an apparatus for extracting such a cylinder liner from a crankcase of an internal combustion engine can engage with large forces.

Especially, when the cylinder liner has to be removed after a large number of operating hours (e.g., for maintenance work), wherein a large force has to be generated between the cylinder liner and the crankcase of the internal combustion engine for loosening the cylinder liner, the at least one groove represents an ideal point of non-destructive attack for, e.g., an apparatus for extracting such a cylinder liner from a crankcase of an internal combustion engine.

The circumferential recess is preferably arranged at an end of the cylinder liner at the cylinder wall, seen for example in a longitudinal direction along a centerline of the cylinder liner. It might be provided that the circumferential recess is provided at one end of the cylindrical portion of the cylinder liner facing a cylinder head in a mounted state of the cylinder liner within the internal combustion engine.

The size of the scraper ring is adapted to fit into the recess and to cover the at least one groove, wherein it can be provided that the whole circumferential recess can be covered by the scraper ring fitted into with size and shape according to the recess.

A removable scraper ring has to be understood as a separate component part, which can be mounted or placed at the cylinder liner and can be removed non-destructively. The scraper ring can be mounted or be held at the cylinder liner in the recess preferably by a press fitting, but conceivably also by mounting parts (e.g., screws or bolts), the geometrical size or shape, bordering components and/or similar measures.

The removable scraper ring can be arranged at the cylinder liner and can be removed and distanced from the cylinder liner as an independent separate part from the cylinder liner. The scraper ring does not have to be mounted at the cylinder liner in a state of delivery It can be provided that aspects of the invention are particularly used for stationary internal combustion engines, preferably fueled by natural gas.

Advantageous embodiments are defined in the dependent claims.

It can be provided that the at least one groove is arranged circumferentially at the diameter of the recess. In particular, it can be provided, that at least 50%, preferably 100%, of the circumference of the diameter of the recess is provided with the at least one groove.

It can be provided, that the recess is arranged in an area of a flange of the cylinder liner, wherein the flange is arranged at a top end of the cylindrical portion facing a cylinder head of the internal combustion engine when the cylinder liner is mounted in the internal combustion engine.

Preferably it can be provided, that the recess and the flange are provided immediately at the same end of the cylinder liner, seen in a cross section of the cylinder liner along the centerline of the cylinder liner.

It can be provided that the cylinder liner is designed as top-stop liner, mid-stop liner or bottom-stop liner.

It can be provided that the scraper ring covers the whole circumferential recess in a direction of the inner diameter of the cylinder liner when the at least one removable scraper ring is arranged in the recess. In other words, it can be provided that the scraper ring completely covers the recess such that an inner surface of the scraper ring becomes a cylindrical extension of the cylinder wall.

It can be provided that the scraper ring comprises an inner diameter having the same diameter as the inner diameter of the cylinder wall. Therefore, it can be provided that the inner diameter of the scraper ring, in a mounted state at the cylinder liner, directly passes into the inner diameter of the cylinder liner, wherein the cylinder wall (and therefore the running surface of a piston) is provided by the inner diameter of the scraper ring and the inner diameter of the cylinder liner.

It can be provided that the scraper ring has essentially the same longitudinal length in a direction parallel to a centerline of the scraper ring as a longitudinal length of the circumferential recess in a direction parallel to a centerline of the cylinder liner.

It can be provided that the scraper ring is manufactured by the same material or by a material having at least the same properties of thermal expansion as a material of the cylinder liner.

An apparatus for extracting a cylinder liner from a crankcase of an internal combustion engine according to certain aspects of the invention can comprise:

- a carrier portion,
- an adjustment portion being arranged at the carrier portion,
- a pulling portion being connected with the adjustment portion and/or the carrier portion,
- at least one central segment, preferably at least one central cone segment, being adjustably connected with the adjustment portion, and
- at least two outer segments, preferably at least two outer cone segments, each comprising at least one gripper portion, wherein the adjustment portion is configured to shift the position of the at least one central segment in longitudinal direction relative to the carrier portion such that said shift leads to a radial movement of the at least two outer segments, preferably by a sliding action between the at least one central cone segment and the at least two outer cone segments, wherein the at least one gripper portion of the at least two outer segments is shaped to fit into the at least one groove of a cylinder liner according to aspects of the invention.

It can be provided that the carrier position is designed as a housing, preferably partly encompassing the at least two outer segments and/or the at least one center segment.

It can be provided that the shifting of the at least two outer segments is carried out by a sliding action between at least one of the at least two outer segments and the at least one center segment, wherein preferably the sliding action acts at a contact surface between the conical portion of at least one of the at least two outer segments, and the at least one center segment, wherein the contact surface is particularly preferably conical.

Instead of a conical sliding action, other mechanisms can in principle be used to generate the radial movement of the at least two outer segments from the longitudinal movement of the at least one central segment, for example, an eccentric mechanism or the like.

For driving the adjustment portion, an electric drive and/or a spindle drive can be present. In preferred embodiments, the longitudinal motion of the at least one central segment can be created manually.

It can be provided that the apparatus comprises a housing, wherein the adjustment portion and/or the carrier portion is arranged at a housing or is part of the housing.

It can be provided that the adjustment portion and/or the carrier portion is/are configured to guide a position of the at least two outer segments in a longitudinal direction and/or in a radial direction. Such guiding can for example be done by use of guiding rails, or simply by the shape of the carrier portion, the adjustment portion, the at least one central segment, and/or the at least two outer segments.

It can be provided that the pulling portion is configured to be connected with a lifting device. Lifting devices can, for example, be provided by a crane, a pulley, or something similar.

For connecting the pulling portion and/or the apparatus with a lifting device, at least one pulling eye, an eyelet and/or hook can be provided.

It can be provided that the at least two outer segments are guided at the central segment at conical contact surfaces, wherein the at least two outer segments are moved in a radial direction by a longitudinal movement of the at least one central segment by use of the conical contact surfaces.

Regarding a method for extracting a cylinder liner, according to aspects of the invention, from a crankcase of an internal combustion engine with an apparatus according to aspects of the invention, the following steps are provided:

removing a scraper ring from the recess, placing the apparatus in the area of the circumferential recess such that the at least one gripper portion substantially lines up with the at least one groove in longitudinal direction of the cylinder liner, adjust the adjusting portion until the at least one gripper portion radially engages with the at least one groove, and extracting the cylinder liner by use of the pulling portion.

BRIEF DESCRIPTION OF THE DRAWINGS

Further details and advantages of the invention are apparent from the accompanying figures and the following description of the drawings. The figures show.

DETAILED DESCRIPTION

Figure 1:
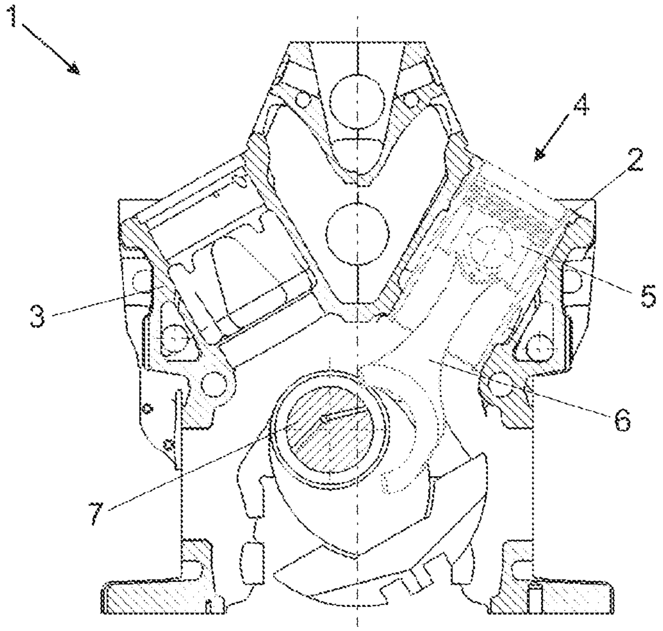
FIG. 1 illustrates the internal combustion engine 1 having a cylinder liner according to a first embodiment of the invention.

FIG. 1 shows an internal combustion engine 1 having a cylinder liner according to a first embodiment of the invention.

As can be seen, the cylinder liner 2 is mounted in the internal combustion engine 1, in more detail at the crankcase 3 of the internal combustion engine 1. The internal combustion engine 1 shown by FIG. 1 is in a state of maintenance work, wherein the power unit 4 is going to be removed.

The power unit 4 comprises the cylinder liner 3, the piston 5 and the connecting rod 6. Beside these main elements of the power unit 4 also small parts as the piston pin, the piston rings and so on are included, which are not mentioned further here.

It can be seen in this FIG. 1 that it is not possible to remove the connecting rod 6 and therefore the piston 5 through the cylinder liner 2, because the dimensions of the connecting rod 6 are too big to fit through the inner diameter of the cylinder liner 2. Therefore, the power unit 4 has to be removed as a whole, wherein the power unit 4 can be disassembled after removing from the crankcase 3 of the internal combustion engine 1.

In this context, in a first step (as shown by FIG. 1), the connecting rod 6 has to be removed from the crankshaft 7 and the cylinder head has to be removed from the internal combustion engine 1 and from the cylinder liner 2

The piston 5 and the connected connecting rod 6 are pressed back into a position, in which an area of the recess 8 of the cylinder liner 2 and the scraper ring 9 (which is arranged in the recess 8) are released.

Figure 2:
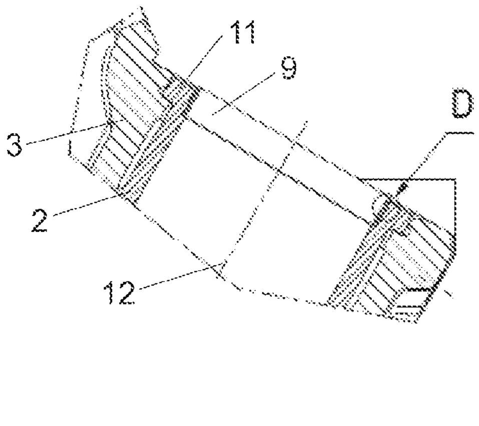
FIG. 2 illustrates the top portion of the cylinder liner of FIG. 1.
Figure 3:
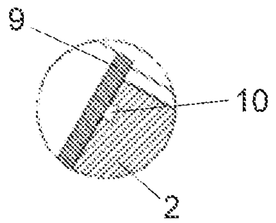
FIG. 3 illustrates the enlarged detail D of FIG. 2.

This can be seen in more detail in FIG. 2, wherein the top portion of the cylinder liner 2 arranged in the crankcase 3 can be seen. FIG. 3 discloses the enlarged detail D of FIG. 2.

As can be seen, the size of the scraper ring 9 is adapted to fit into the recess 8 of the cylinder liner 2, wherein the groove 10 of the cylinder liner 2 is covered by the scraper ring 9.

The cylinder liner 2 of this embodiment is designed as a top-stop liner as can be seen by the flange 11, which is provided at an end of the cylinder liner 2 facing the cylinder head in a mounted state in the internal combustion engine 1.

The recess 8 is arranged in an area of a flange 11 of the cylinder liner 2, wherein the flange 11 is arranged at a top end of the cylindrical portion facing a cylinder head of the internal combustion engine 1 when the cylinder liner 2 is mounted in the internal combustion engine 1.

The recess 8 is arranged circumferentially at the inner diameter of the cylindrical portion of the cylinder liner 2 having a larger diameter than the inner diameter of the cylinder wall, wherein the circumferential recess 8 is located at one end of the cylinder liner 2 facing the cylinder head in a mounted state inside the internal combustion engine 1.

The scraper ring 9 covers the whole circumferential recess 8 in a direction of the inner diameter of the cylinder liner 2, when the at least one removable scraper ring 9 is arranged in the recess 8.

The scraper ring 9 comprises an inner diameter having the same diameter as the inner diameter of the cylinder liner 2 and the scraper ring 9 has essentially the same longitudinal length in direction parallel to a centerline 12 of the scraper ring 9 as a longitudinal length of the circumferential recess 8 in direction parallel to a centerline 12 of the cylinder liner 2.

Figure 4:
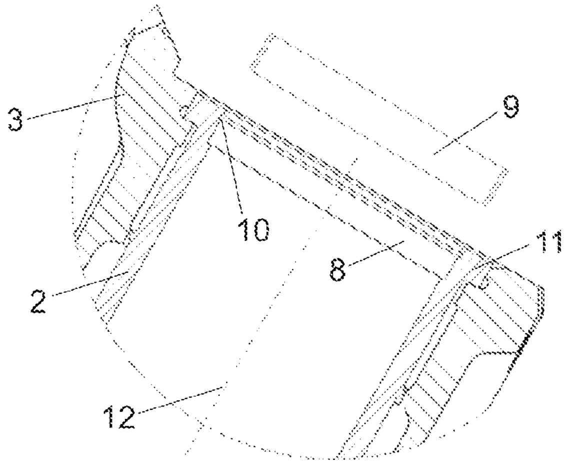
FIG. 4 illustrates the cylinder liner of FIG. 1 with removed scraper ring.

In a next step to remove the power unit 4, the scraper ring 9 is removed from the cylinder liner 2 as shown by FIG. 4. By removing the scraper ring 9, the recess 8 and the circumferential groove 10 at the inner diameter of the recess 8 are released.

Figure 5:
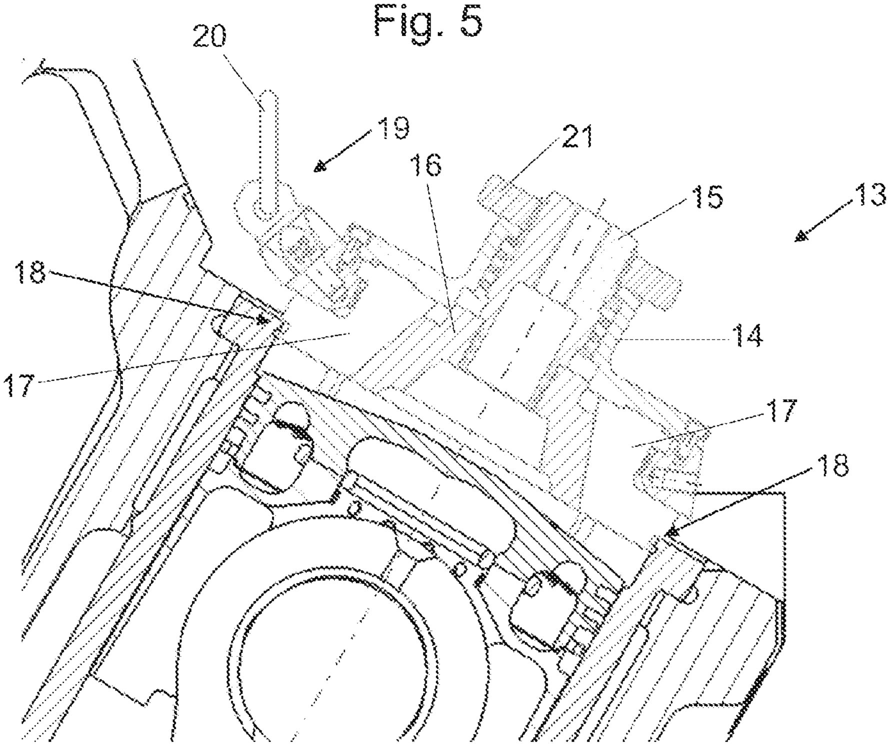
FIG. 5 illustrates the cylinder liner of FIG. 1 with attached apparatus for extracting a cylinder liner.

In a next step (as shown by FIG. 5), an apparatus 13 for extracting a cylinder liner 2 from a crankcase 3 of an internal combustion engine 1 is placed in the area of the flange 11, such that the gripper portions 18 of the apparatus 13 substantially line up with the at least one groove 10 in a longitudinal direction of the cylinder liner 2.

The apparatus 13 comprises a carrier portion 14, an adjustment portion 15 being arranged at the carrier portion 14, a central segment 16, and at least two outer segments 17 each comprising at least one gripper portion 18.

The adjustment portion 15 is configured to shift the position of the central segment 16 in a longitudinal direction relative to the carrier portion 14, such that said shift leads to a radial movement of the at least two outer segments 17.

The adjustment portion 15 of this embodiment is designed as an adjustment screw, which engages with a thread on an adjusting nut 21 on the carrier portion 14. By screwing the adjustment portion 15, the adjustment portion 15 can be moved (together with the central segment 16 attached to the adjustment portion 15) in a longitudinal direction relative to the carrier portion 14.

By the sliding action between the central segment 16 and the at least two outer segments 17 (at the conical contact surfaces), this longitudinal movement is transformed into a radial movement of the at least two outer cone segments 17. In this way, the radial position of the at least two outer cone segments 17 can be varied by the adjustment portion 15, wherein the at least two outer cone segments 17 can be moved in a position, wherein the gripping portions 18 of the outer segments 17 engage into the groove 10 of the cylinder liner 2.

The gripper portions 18 of the at least two outer segments 17 are shaped to fit into the groove 10 of the cylinder liner 2.

Furthermore, the apparatus 13 comprises a pulling portion 19, which is configured to be connected with a lifting device by a pulling eye 20.

In a next step, the cylinder liner 2 (together with the whole power unit 4) can be removed from the crankcase 3 using the pulling portion 19.

Figure 6:
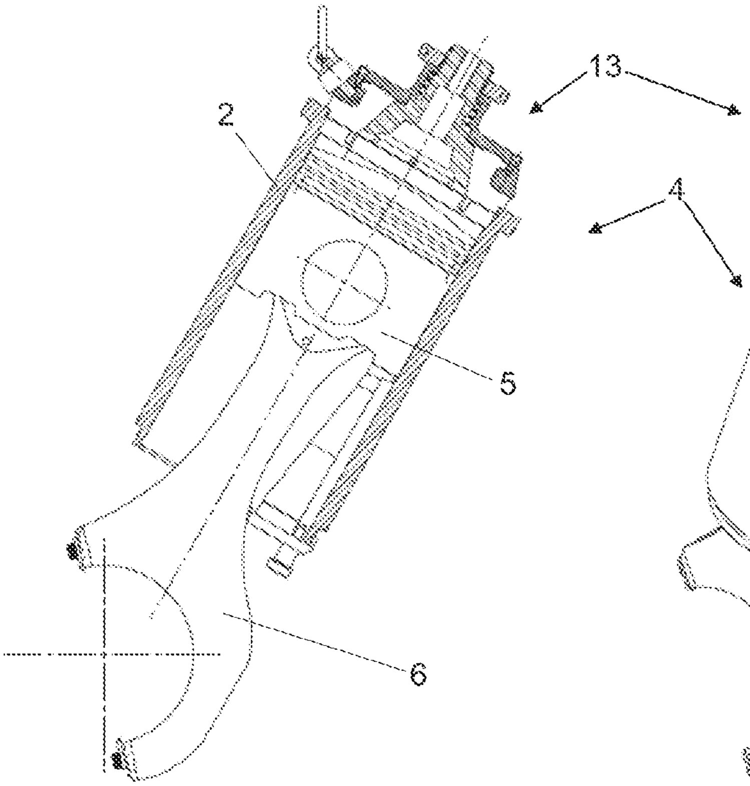
FIGS. 6 and 7 illustrate the removed power unit with attached apparatus.
Figure 7:
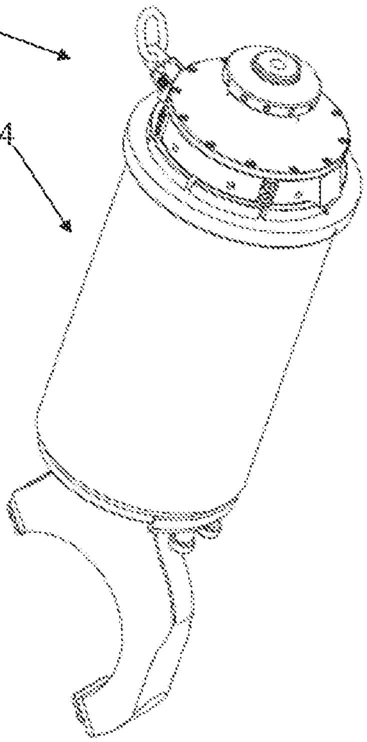

In FIGS. 6 and 7, the removed power unit 4 with attached apparatus can be seen.

LIST OF REFERENCE SIGNS

1 internal combustion engine
2 cylinder liner
3 crankcase
4 power unit
5 piston
6 connecting rod
7 crankshaft
8 recess
9 scraper ring
10 groove
11 flange
12 centerline
13 apparatus
14 carrier portion
15 adjustment portion
16 central segment
17 outer segment
18 gripper portion
19 pulling portion
20 pulling eye
21 adjusting nut

The invention claimed is:

1. A system, comprising:
a tool configured to extract a cylinder liner from a crankcase of an internal combustion engine, wherein the tool comprises:
a carrier portion;
an adjustment portion being arranged at the carrier portion;
a pulling portion being connected with the adjustment portion and/or the carrier portion;
at least one central segment being adjustably connected with the adjustment portion;
at least two outer segments, each comprising at least one gripper portion;
wherein the adjustment portion is configured to shift a position of the at least one central segment in a longitudinal direction relative to the carrier portion to transfer a force to the at least two outer segments to drive a radial movement of the at least two outer segments, wherein the at least one gripper portions of the at least two outer segments are shaped to fit into at least one groove of the cylinder liner.

2. The system of claim 1, comprising:
the cylinder liner for the internal combustion engine, comprising:
a cylindrical portion having an outer diameter and an inner diameter, wherein the inner diameter at least partly defines a cylinder wall when the cylinder liner is mounted in the internal combustion engine;
a circumferential recess at the inner diameter of the cylindrical portion, wherein the circumferential recess comprises a diameter larger than the inner diameter of the cylinder wall, wherein the circumferential recess is located at one end of the cylindrical portion, and
a removable scraper ring;
wherein the circumferential recess comprises the at least one groove, wherein a size of the removable scraper ring is adapted to fit into the circumferential recess and to cover the at least one groove.

3. The system according to claim 2, comprising the internal combustion engine having the cylinder liner.

4. The system according to claim 1, wherein the adjustment portion and/or the carrier portion are configured to guide a position of the at least two outer segments in a longitudinal direction and/or in a radial direction.

5. The system according to claim 1, wherein the pulling portion is configured to be connected with a lift.

6. A method for extracting the cylinder liner from the crankcase of the internal combustion engine with the tool according to claim 1, comprising the following steps:
removing a removable scraper ring from a circumferential recess of the cylinder liner, wherein the circumferential recess comprises the at least one groove,
placing the tool in an area of the circumferential recess such that the at least one gripper portion substantially lines up with the at least one groove in the longitudinal direction of the cylinder liner;
adjusting the adjustment portion to transfer the force to the at least two outer segments to drive the radial movement of the at least two outer segments until the at least one gripper portion radially engages with the at least one groove; and,
extracting the cylinder liner by use of the pulling portion of the tool.

7. The system according to claim 1, wherein the at least one central segment comprises a first conical surface, and the at least two outer segments comprise a second conical surface.

8. The system according to claim 7, wherein the adjustment portion is configured to shift a position of the at least one central segment in the longitudinal direction relative to the carrier portion to cause the radial movement of the at least two outer segments by a sliding action between the first and second conical surfaces.

9. A system, comprising:
a cylinder liner, comprising
a cylindrical portion having an outer diameter and an inner diameter, wherein the inner diameter at least partly defines a cylinder wall for a reciprocating piston;
a circumferential recess at the inner diameter of the cylindrical portion, wherein the circumferential recess comprises a diameter larger than the inner diameter of the cylinder wall;
at least one groove in the circumferential recess; and
a removable scraper ring configured to fit into the circumferential recess and to cover the at least one groove; and
a tool configured to extract the cylinder liner from a machine, wherein the tool comprises:
a central segment; and
a plurality of outer segments, wherein the central segment is configured to move in an axial direction to transfer a force to the plurality of outer segments to drive the plurality of outer segments in a radial direction into the at least one groove.

10. The system of claim 9, wherein the at least one groove is disposed at an end portion of the cylindrical portion, and the circumferential recess and the at least one groove are disposed at a flange of the cylindrical portion.

11. The system of claim 9, wherein an inner diameter of the removable scraper ring is the same as the inner diameter of the cylindrical portion, wherein a longitudinal length of the removable scraper ring is the same as a longitudinal length of the cylindrical portion along longitudinal axes of the removable scraper ring and the cylindrical portion, respectively.

12. The system of claim 9, wherein the tool is configured to extract the cylinder liner from the machine while the reciprocating piston remains in the machine.

13. The system of claim 9, comprising the machine having the cylinder liner and the reciprocating piston disposed in the cylinder liner.

14. The system of claim 9, wherein the tool is configured to transfer the force via mating surfaces that slide along one another between the central segment and the plurality of outer segments.

15. The system of claim 14, wherein the mating surfaces comprises first and second tapered surfaces.

16. A system, comprising:

a tool configured to extract a cylinder liner from a machine, wherein the tool comprises:

a central segment; and a plurality of outer segments, wherein the central segment is configured to move in an axial direction to transfer a force to the plurality of outer segments to drive the plurality of outer segments in a radial direction into at least one groove in the cylinder liner.

17. The system of claim 16, wherein the tool is configured to transfer the force via mating surfaces that slide along one another between the central segment and the plurality of outer segments.

18. The system of claim 17, wherein the mating surfaces comprises first and second tapered surfaces.

19. The system of claim 17, wherein the mating surfaces comprises first and second conical surfaces.

20. The system of claim 16, comprising the cylinder liner having the at least one groove within a circumferential recess in the cylinder liner, wherein a removable scraper ring is disposed in the circumferential recess over the at least one groove, and the circumferential recess is disposed at an end portion of the cylinder liner.

* * * * *